No. 811,663. PATENTED FEB. 6, 1906.
F. W. REEVES.
TURBINE.
APPLICATION FILED APR. 14, 1904.
6 SHEETS—SHEET 3.
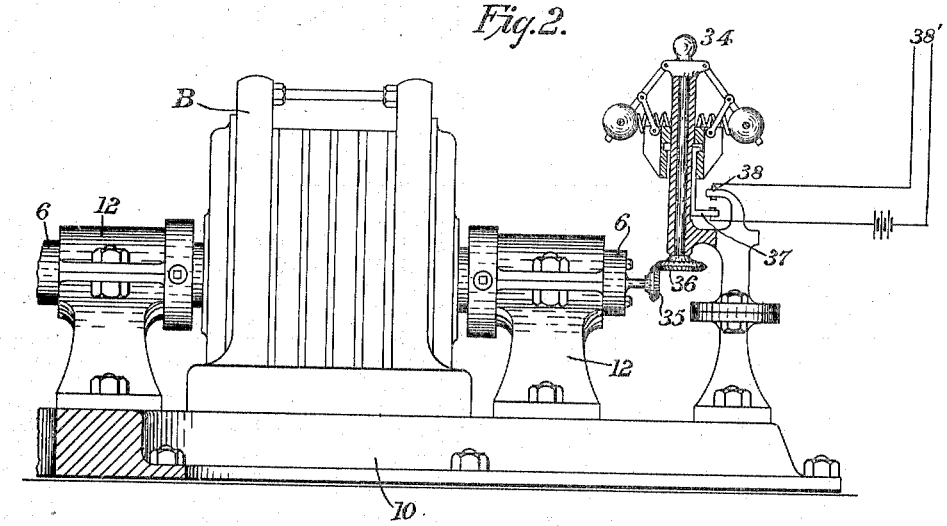
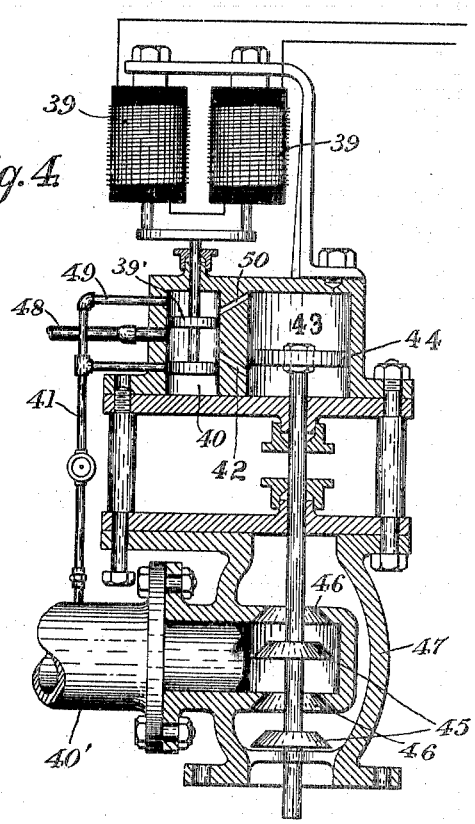
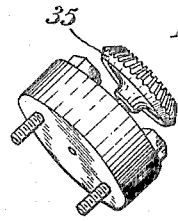
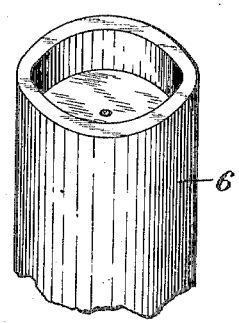
Witnesses;
Prudence A. McFarney
Nellie A. Mohler.
Inventor,
Frederick W. Reeves
per
Richard S. Harrison, his Atty.

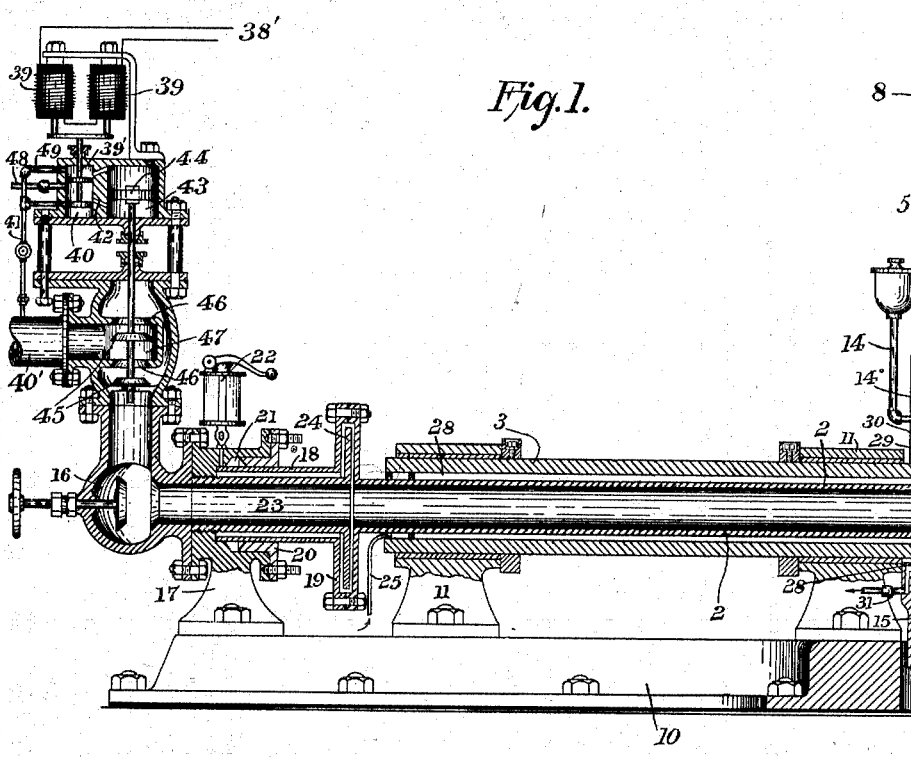

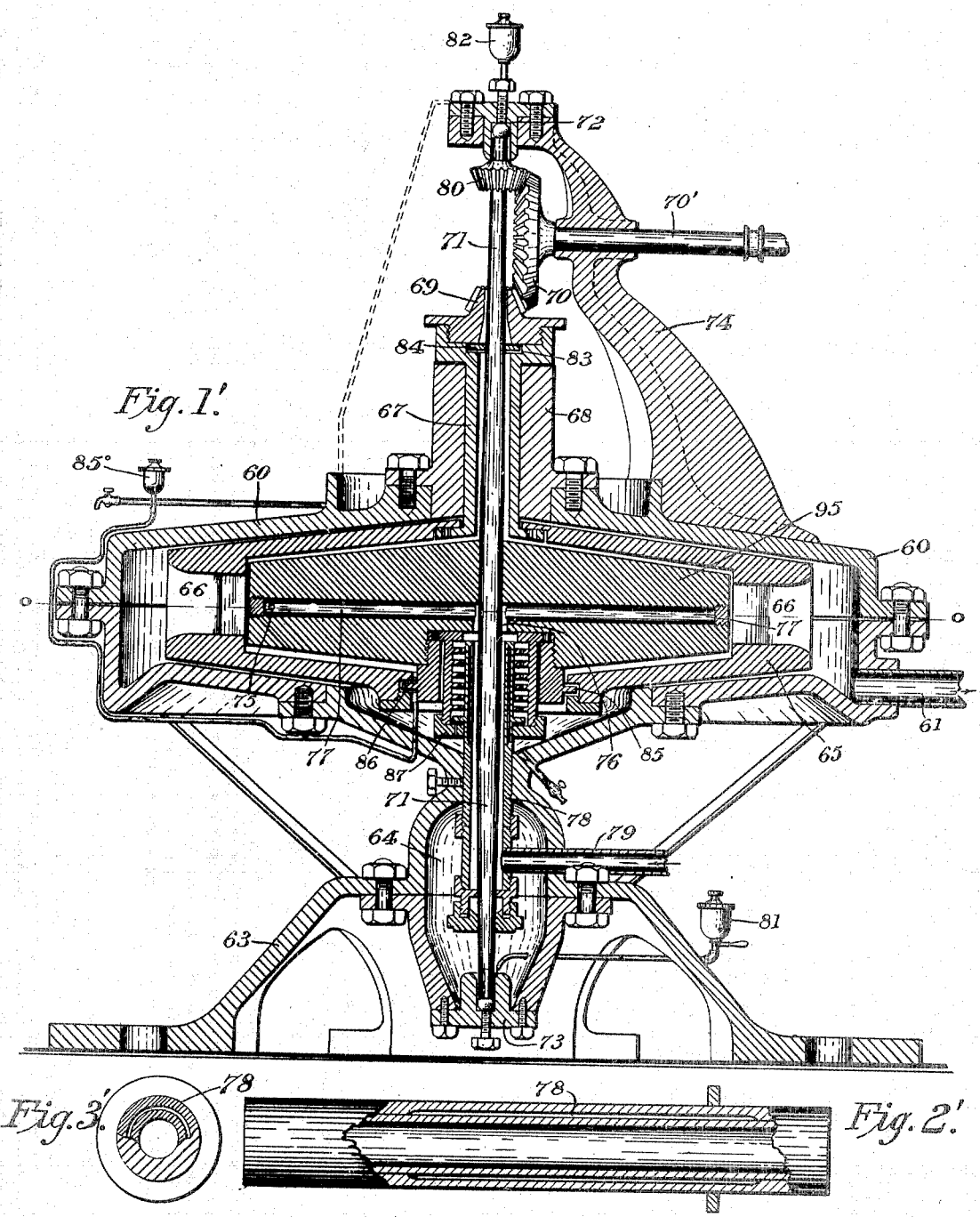

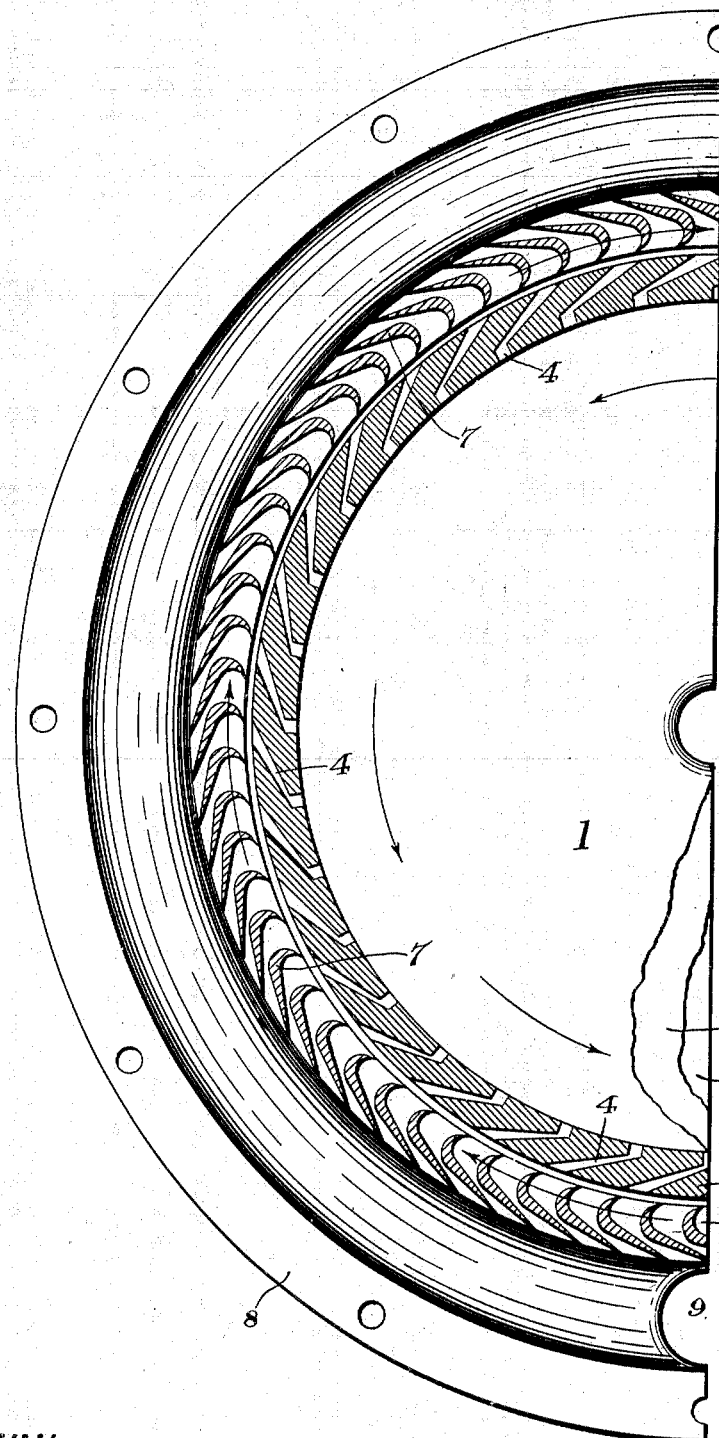

No. 811,663. PATENTED FEB. 6, 1906.
F. W. REEVES.
TURBINE.
APPLICATION FILED APR. 14, 1904.

6 SHEETS—SHEET 5.

Witnesses.
Prudence A. McTurney
Nellie O. Mohler

Inventor:
Frederick W. Reeves
per
Richard S. Harrison, Attorney.

No. 811,663. PATENTED FEB. 6, 1906.
F. W. REEVES.
TURBINE.
APPLICATION FILED APR. 14, 1904.
6 SHEETS—SHEET 6.
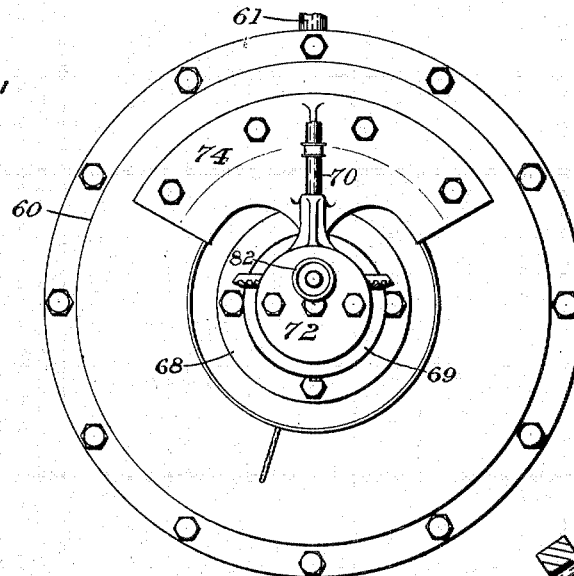
Fig. 7.
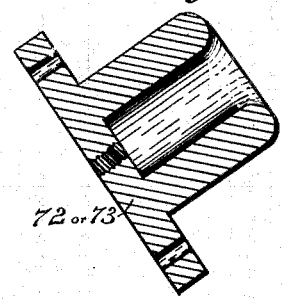
Fig. 8.
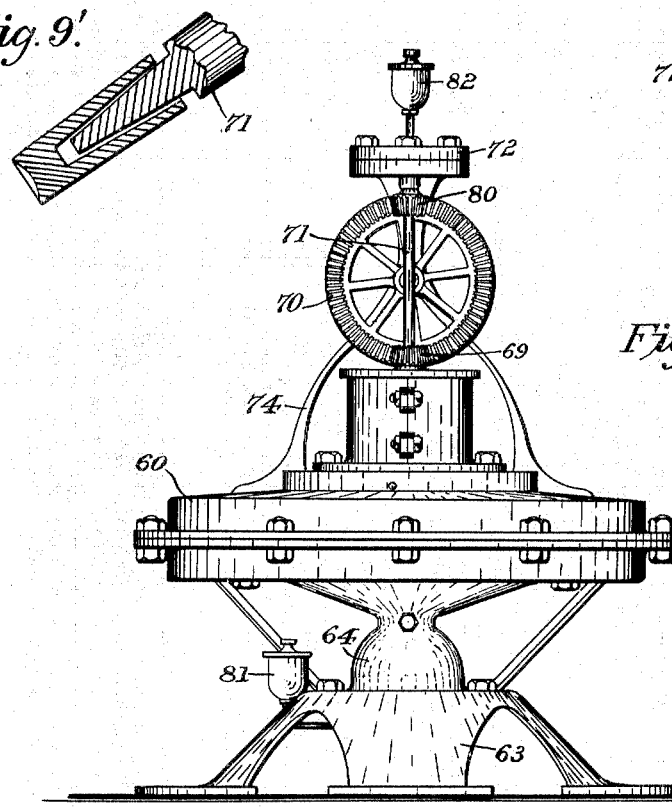
Fig. 9.
Fig. 10.
Witnesses.
Prudence A. McVarney.
Nellie A. Mohler.
Inventor.
Frederick W. Reeves
per
Richard S. Harrison, his Attorney.

UNITED STATES PATENT OFFICE.

FREDERICK W. REEVES, OF ALLEGHENY, PENNSYLVANIA, ASSIGNOR OF ONE-HALF TO JOHN R. JAMES, OF PITTSBURG, PENNSYLVANIA.

TURBINE.

No. 811,663.      Specification of Letters Patent.      Patented Feb. 6, 1906.

Application filed April 14, 1904. Serial No. 203,102.

*To all whom it may concern:*

Be it known that I, FREDERICK W. REEVES, a citizen of the United States, residing at Allegheny, in the county of Allegheny and State of Pennsylvania, have invented a new and uesful Improvement in Turbines, of which improvement the following is a specification.

This invention has for its object the provision of a turbine adapted to rotate at about one-half the speed usually attained in engines of this class under similar steam supply and pressure without reduction of efficiency.

Other objects in view are utilization of primary effects of steam before mutulation, simplicity, durability, &c., tending to perfection of engines of this class.

In the accompanying drawings I have in various ways illustrated my improved engine and detail parts thereof, in which drawings—

Figure 4:
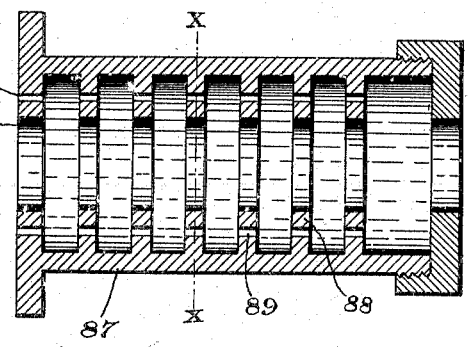
Figure 5:
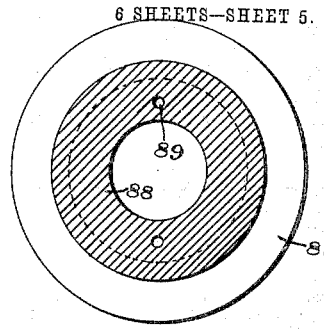
Figure 6:
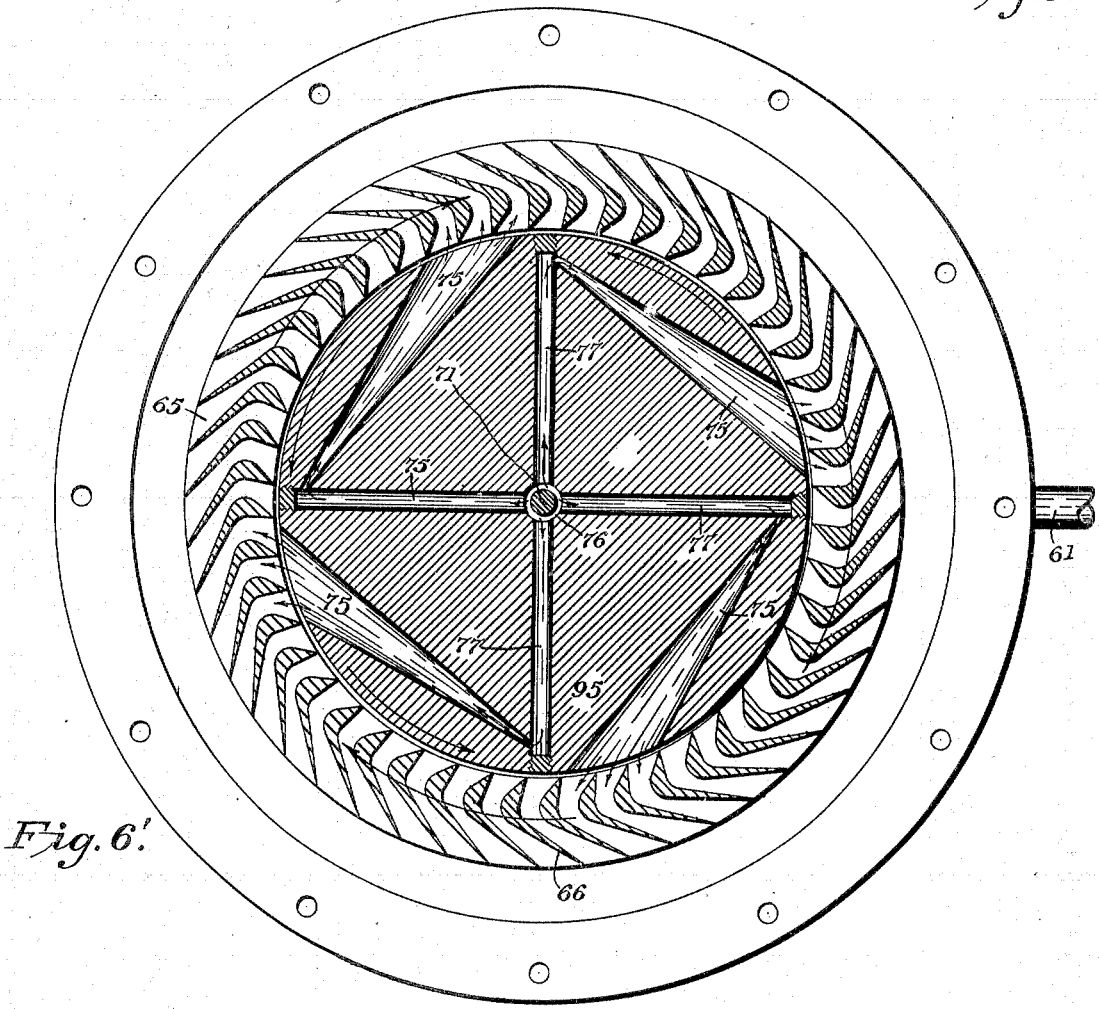

Figures 1 and 2 combined is a longitudinal side view of my improved engine, the major portion of which is shown in section. Fig. 3 is an enlarged end view of a portion of the primary and secondary turbine-wheels in section, also a portion of the casing thereabout. Fig. 4 is a vertical side view of the valve mechanism, partly in section. Fig. 5 is an enlarged perspective view of the end of the secondary wheel-shaft. Fig. 6 is a perspective view of the governor-pinion detached from the end of said shaft. Fig. 7 is a side view of a portion of the primary wheel-shaft, partly in section. Fig. 8 is an end view of same in section on line B B of Fig. 7.

In the construction of my improved turbine I provide a hollow primary wheel 1 wherein the steam is received through a tube 2, inclosed within and revoluble with the hollow shaft 3 of said wheel, passing therefrom out of the expanding nozzles 4, which are formed at equidistant points about its periphery. This primary wheel is inclosed within a hollow secondary wheel 5, provided with a shaft 6, the periphery of said wheel being provided with vanes 7, against which the steam strikes as it issues from the nozzle of the primary wheel and imparts a rotary motion thereto, said secondary wheel being inclosed within a fixed casing 8, connected to an exhaust 9. The steam being received in the primary wheel at approximately boiler-pressure will, owing to the shape of the diverging expansion-exits, (nozzle-shaped peripheral ports,) expand therein, and as the said exits are tangentially disposed about the wheel-periphery a back pressure, or pressure in the direction opposite the flow of the steam, and also an additional back pressure, due to the expansion and increasing steam velocity, occurs within the multiplicity of nozzles, thereby imparting a rotary motion to said wheel, and as the steam passing out of the large end of said nozzle will have expended its expansive force and transformed wholly into its velocity or kinetic energy the said steam will impinge upon the vanes of the secondary wheel and drive it in a direction opposite to that of the primary. In other words, the expansive force or initial energy of the steam is made use of to drive the primary wheel in one direction, (a direction opposite the flow of steam,) and the velocity or kinetic energy of said steam as it issues from the primary nozzle is made use of to drive the secondary wheel in an opposite direction. In this case both the pressure and expansive force of the steam and the velocity are made use of without loss and the speed of the turbine reduced to one-half of the ordinary turbine.

If the turbine be employed to drive electric generators, one may be secured to the bed-plate 10 between the bearings 11 and the armature thereof secured to the shaft of the primary wheel and another, as B, secured between the bearings 12 of the bed-plate and the armature thereof secured to the shaft of the secondary wheel.

A clearance-space is left between the secondary wheel and casing and likewise between the primary and secondary wheel. When said wheels are in motion, a vacuum is formed which dispenses with the friction heretofore occasioned therebetween by air or condensed water, the vacuum condition being assisted by causing water or oil to flow from a pipe 14 into the U-shaped annular groove 14' in the edge of the secondary wheel, where it incloses the annular flange 15, carried by the primary wheel, said water or oil being caused to effectually fill said space and form a seal by the centrifugal motion.

As the throttle-valve 16 is fixed to a suitable standard 17 of the bed-plate and the tube for conducting the steam into the primary wheel revolves, it is evident that some means must be employed between the stationary valve and rotatable tube to permit the steam passing into the latter. Therefore I have provided what way be termed a "centrifugal" stuffing-box or seal, comprehending a sleeve 18, provided with a flanged head 19, rotatably fitted into a gland 20, secured upon or to the said standard 17, the packing-space 21 between the end of said gland and opening into which it is fitted being lubricated with oil from a pump 22. The tube 2 being provided with a flanged end is secured to and forms a head for the said centrifugal stuffing-box. Secured fast within the standard is a pipe 23, provided with a flanged head 24, and as this head is inclosed within the stuffing-box the steam flowing into the tube will condense more or less and the centrificial motion will cause it to flow about the head of the stuffing-box and form a water seal, thus preventing the steam finding an exit at this point. After the turbine has been started the gland 20 may be loosened up to decrease the friction of the packing. Undue heating of the hollow primary shaft is avoided by causing a stream of water to pass from the mouth of a fixed pipe 25 through openings 26 in the collar 27 into the space 28 between said shaft and the tube 2, which water is caused to completely surround the tube, but not in contact. The centrificial motion forces the water to the interior surface of the shaft 3 and finds its way out through one or more openings 28, formed through the collar 29, carried by the primary shaft into the groove 30 in the said casing 8, where it circulates and forms a seal between the said casing and shaft-collar and finds its exit through a pipe or cock 31. A similar water seal is made between the collar 32 of the secondary wheel and the casing by causing water to enter and leave the groove 33 by pipes (not shown) in like manner as described. In this case the steam is caused to intermittingly pass through the throttle-valve to the primary wheel, and to accomplish same I provide a suitable governor 34, which is operated by a pinion 35 upon the end of the secondary shaft, meshing with the pinion 36 of the governor, and as soon as the secondary wheel assumes maximum speed the governor elevates a sliding member 37 into contact with a fixed member 38, thereby closing an electric circuit 38', having a pair of solenoid-magnets 39 therein. Now when these solenoid-magnets become energized they elevate the double piston 39' in the chamber 40, causing steam to be admitted to the lower end of said chamber from the main steam-pipe 40' by way of a branch pipe 41, permitting it to pass through a port 42 into the chamber 43, elevate the piston 44, and as the rod of said piston carries valves 45 they will likewise be elevated and close the ports 46 in the chamber 47, interposed between the throttle-valve and main steam-supply pipe. As the energizing of the solenoid-magnets is but momentary the breaking of the circuit at the governor-contacts as a matter of course causes the deënergizing of the magnet, permitting the said piston 39' to descend, exhausting the steam from the chambers out through the small exhaust-pipe 48, and permitting steam to enter from the branch pipe 49 to the smaller chamber and from said chamber over to that of the valve-piston by way of the port 50. By this means steam is intermittingly supplied to the primary wheel.

Having thus shown and described my improved turbine in horizontal form adapted for double service, particularly where much power is required, and as the main features may be embodied in one for single drive and vertical form, I deem it advisable to also show and describe the same as a "modification."

Referring to the drawings, Fig. 1' is a vertical sectional view through said modified form. Fig. 2' is a horizontal view of the steam-tube, shown partly in section. Fig. 3' is an end view of same, partly in section. Fig. 4' is a horizontal sectional view through the centrificial stuffing-box. Fig. 5' is an end sectional view through said box on line X X of said Fig. 4'. Fig. 6' is an enlarged plan view through the turbine on line o o of Fig. 1', showing the primary and secondary wheels in section. Fig. 7' is a plan view of the turbine. Fig. 8' is a sectional view through the ball-bearing cup for the ends of the primary wheel-shaft and ball-socket, partly in section. Fig. 9' is a plan view of one end of primary shaft, showing the socket attached thereto and in section. Fig. 10' is a vertical side view of the complete turbine at right angles from that of Fig. 1'.

In the modified form the casing 60 is connected with an exhaust-pipe 61 and is mounted upon a bed-plate 63, a chamber 64 being formed at the juncture of the casing and bed-plate where the steam-inlet pipe connects. In this case the secondary wheel 65 having peripheral vanes 66 is attached to a hollow shaft 67, passing up through a bearing 68, arranged upon the casing, and is provided at its upper end with a gear-pinion 69, which meshes with a gear 70, carried by the shaft 70'. The primary wheel 95, which is inclosed within the secondary, is mounted upon a flexible shaft 71, fitted into ball-bearings 72 and 73, arranged, respectively, at the upper end of the bracket 74, carrying the gear 70, and the base of the chamber 64, said primary wheel receiving steam into the nozzles 75 through the ports 76 and 77 from a tube 78, communicating with the inlet-supply pipe 79. The flexible shaft of the primary wheel is also provided with a pinion 80, which meshes with the aforesaid gear 70, and as both the primary and secondary wheels travel in opposite directions and at the same speed the power from both is transmitted through the pinions to the gear and the shaft of the latter made use of as the drive. The bearing at the lower end of the flexible shaft is fed with oil from a cup 81, while that at the upper end is fed from a cup 82. Oil is also caused to enter into the groove 83 in the secondary shaft and from a seal about the collar 84 of the primary shaft, and likewise either oil or water is fed into the groove 85 of the secondary wheel from a cup 85 to form a seal around the collar 86 of the primary to permit the vacuum being formed between the casing and wheels when the latter are in motion. In this case the condensed steam passes into the centrificial stuffing-box 87, carried by the primary wheel and surrounding the aforesaid steam-tube 78, the annular collars 88 in said stuffing-box being perforated by openings 89 to permit the water circulating all the way about.

It is apparent that other modifications in detail and arrangements of my improvement may be made without departing from the spirit of my invention.

In the appending claims I have made use of the words "initial energy" to cover the expression "pressure and expansive force." Therefore where the same occurs it is to be understood as meaning that which drives the primary wheel.

Having thus fully shown and described my invention, what I claim as new, and desire to secure by Letters Patent, is—

1. In a steam-turbine, a primary wheel having internal tangentially-disposed outwardly-diverging nozzles opening into the periphery thereof and driven in a direction opposite the flow of steam by the initial energy of the steam acting in said nozzles, and a secondary wheel having tangentially-disposed peripheral vanes therein and driven in an opposite direction to that of the primary wheel by the velocity of the steam as it issues from the primary-wheel nozzles, said secondary wheel entirely inclosing said primary wheel.

2. In a steam-turbine, a primary wheel having internal tangentially-disposed outwardly-diverging nozzles opening into the periphery thereof and driven in a direction opposite the flow of steam by the initial energy of the steam acting in said nozzles, and a secondary wheel having peripheral vanes therein and driven in an opposite direction to that of the primary wheel by the velocity of the steam as it issues from the primary-wheel nozzles, said secondary wheel entirely inclosing said primary wheel.

3. In a steam-turbine, a primary wheel having internal tangentially-disposed outwardly-diverging nozzles opening into the periphery thereof and driven in a direction opposite the flow of steam by the initial energy of the steam acting in said nozzles, and a secondary wheel having peripheral vanes therein and driven in an opposite direction to that of the primary wheel by the velocity of the steam as it issues from the primary-wheel nozzles, said secondary wheel entirely inclosing said primary wheel and provided with liquid sealing members at its axis.

4. In a steam-turbine, a primary wheel having internal tangentially-disposed outwardly-diverging nozzles opening into the periphery thereof adapted to be driven in one direction by the steam acting in said nozzles, and a secondary wheel the periphery of which is provided with hook-shaped vanes extending over the periphery of said primary wheel and adapted to be driven in an opposite direction to that of said primary wheel, the vanes of said secondary wheel being disposed with their hook-shaped portion inwardly.

5. In a steam-turbine, a primary wheel having internal tangentially-disposed outwardly-diverging nozzles opening into the periphery thereof adapted to be driven in one direction by the steam acting in said nozzles, and a secondary wheel the periphery of which is provided with hook-shaped vanes extending over the periphery of said primary wheel and adapted to be driven in an opposite direction to that of said primary wheel, the vanes of said secondary wheel being disposed with their hooked-shaped portion inwardly and of increased thickness at their middle so as to contract the space therebetween at that point.

6. In a steam-turbine, a primary wheel having internal tangentially-disposed outwardly-diverging nozzles opening into the periphery thereof adapted to be driven in one direction by the steam acting in said nozzles, and a secondary wheel the periphery of which is provided with hook-shaped vanes extending over the periphery of said primary wheel and adapted to be driven in an opposite direction to that of said primary wheel, the vanes of said secondary wheel being disposed with their hook-shaped portion inwardly and their straight portions tangentially in an opposite direction to those of said primary wheel.

7. In a steam-turbine, a primary wheel having internal tangentially-disposed outwardly-diverging nozzles opening into the periphery thereof adapted to be driven in one direction by the steam acting in said nozzles, and a secondary wheel the periphery of which is provided with hooked-shaped vanes extending over the periphery of said primary wheel and adapted to be driven in an opposite direction to that of said primary wheel, the vanes of said secondary wheel being disposed with their hook-shaped portion inwardly and their straight portions tangentially in an opposite direction to those of said primary wheel.

8. In a steam-turbine, a primary wheel having internal tangentially-disposed outwardly-diverging nozzles opening into the periphery thereof adapted to be rotated in one direction by the steam acting in said nozzles, and a secondary wheel entirely inclosing said primary wheel the periphery of which is provided with hook-shaped vanes adapted to be driven in an opposite direction to that of said primary wheel by the action of the steam on said vanes as it issues from the nozzles of said primary wheel.

9. In a steam-turbine, a primary wheel having internal tangentially-disposed outwardly-diverging nozzles opening into the periphery thereof adapted to be rotated in one direction by the steam acting in said nozzles, and a secondary wheel entirely inclosing said primary wheel the periphery of which is provided with hook-shaped vanes disposed tangentially in an opposite direction to the nozzles of said primary wheel and adapted to be driven in an opposite direction to that of said primary wheel by the action of the steam on said vanes as it issues from the nozzles of said primary wheel.

10. In a steam-turbine, a primary wheel having internal tangentially-disposed outwardly-diverging nozzles opening into the periphery thereof adapted to be rotated in one direction by the steam acting in said nozzles, a secondary wheel entirely inclosing said primary wheel the periphery of which is provided with hook-shaped vanes adapted to be driven in an opposite direction to that of said primary wheel by the action of the steam on said vanes as it issues from the nozzles of said primary wheel, and a liquid seal between the shaft of said primary wheel and wall of said secondary wheel.

11. In a steam-turbine, a primary wheel having internal tangentially-disposed outwardly-diverging nozzles opening into the periphery thereof adapted to be rotated in one direction by the steam acting in said nozzles, a secondary wheel entirely inclosing said primary wheel the periphery of which is provided with hook-shaped vanes disposed tangentially in an opposite direction to the nozzles of said primary wheel and adapted to be driven in an opposite direction to that of said primary wheel by the action of the steam on said vanes as it issues from the nozzles of said primary wheel, and a liquid seal between the shaft of said primary wheel and wall of said secondary wheel.

12. In a steam-turbine, a hollow rotatable steam-conducting shaft communicating at one end with a stationary steam-supply member, a liquid sealing device interposed therebetween, a primary wheel carried by the opposite end of said hollow shaft and provided with internal tangentially-disposed outwardly-diverging nozzles opening out into the periphery of said wheel and communicating with said hollow shaft, a secondary wheel mounted upon a shaft and entirely inclosing said primary wheel the periphery of which is provided with hook-shaped vanes tangentially disposed in an opposite direction to those of the primary wheel, and a casing surrounding said secondary wheel and provided with an exhaust-opening.

13. In a steam-turbine, a hollow rotatable steam-conducting shaft communicating at one end with a stationary steam-supply member, a liquid sealing device interposed therebetween, a primary wheel carried by the opposite end of said hollow shaft and provided with internal tangentially-disposed outwardly-diverging nozzles opening out into the periphery of said wheel and communicating with said hollow shaft, a secondary wheel mounted upon a shaft and entirely inclosing said primary wheel the periphery of which is provided with hook-shaped vanes tangentially disposed in an opposite direction to those of the primary wheel, a casing surrounding said secondary wheel and provided with an exhaust-opening, a liquid seal between the wall of the secondary wheel and primary shaft, and a liquid seal between the shaft of said secondary wheel and the casing inclosing said wheel.

14. In a steam-turbine, a hollow rotatable steam-conducting shaft communicating at one end with a stationary steam-supply member, a liquid sealing device interposed therebetween, a primary wheel carried by the opposite end of said hollow shaft and provided with internal tangentially-disposed outwardly-diverging nozzles opening out into the periphery of said wheel and communicating with said hollow shaft, a secondary wheel mounted upon a shaft and entirely inclosing said primary wheel the periphery of which is provided with hook-shaped vanes tangentially disposed in an opposite direction to those of the primary wheel, and a casing surrounding said secondary wheel and provided with an exhaust-opening, in combination with a governor-controlled valve to permit steam to intermittingly pass through said stationary supply member to the primary wheel.

15. In a steam-turbine, a hollow rotatable steam-conducting shaft communicating at one end with a stationary steam-supply member, a liquid sealing device interposed therebetween, a primary wheel carried by the opposite end of said hollow shaft and provided with internal tangentially-disposed outwardly-diverging nozzles opening out into the periphery of said wheel and communicating with said hollow shaft, a secondary wheel mounted upon a shaft and entirely inclosing said primary wheel the periphery of which is provided with hook-shaped vanes tangentially disposed in an opposite direction to those of the primary wheel, a casing surrounding said secondary wheel and provided with an exhaust-opening, a liquid seal between the wall of the secondary wheel and primary shaft, and a liquid seal between the shaft of said secondary wheel and the casing inclosing said wheel, in combination with a governor-controlled valve to permit steam to intermittingly pass through said stationary supply member to the primary wheel.

16. In a steam-turbine, a hollow rotatable steam-conducting shaft communicating at one end with a stationary steam-supply member and carrying at its opposite end a primary wheel having internal outwardly-diverging nozzles opening out into the periphery thereof and communicating with said hollow shaft, a secondary wheel mounted upon the end of a shaft and entirely inclosing the primary wheel the periphery of which is provided with vanes tangentially disposed in an opposite direction to those of said primary wheel, a casing inclosing said secondary wheel and provided with an exhaust-opening, a liquid seal formed between the shaft of said primary wheel and wall of the secondary wheel, like seals between the casing and shafts of the primary and secondary wheels, and a valve-chamber provided with a valve communicating with said stationary steam-supply member, in combination with a governor to operate the valve of said chamber to intermittingly supply steam to the primary wheel.

17. In a steam-turbine, a hollow rotatable steam-conducting shaft communicating at one end with a stationary steam-supply member and carrying at its opposite end a primary wheel having internal outwardly-diverging nozzles opening out into the periphery thereof and communicating with said hollow shaft, a secondary wheel mounted on the end of a shaft and entirely inclosing the primary wheel the periphery of which is provided with vanes tangentially disposed in an opposite direction to those of said primary wheel, a casing inclosing said secondary wheel and provided with an exhaust-opening, a liquid seal formed between the shaft of said primary wheel and wall of the secondary wheel, like seals between the casing and shafts of the primary and secondary wheel, a liquid sealing device interposed between said hollow shaft and stationary steam-supply member, and a valve-chamber provided with a valve communicating with said stationary steam-supply member, in combination with a governor to operate the valve of said chamber to intermittingly supply steam to the primary wheel.

18. In a steam-turbine, a hollow rotatable steam-conducting shaft communicating at one end with a stationary steam-supply member and carrying at its opposite end a primary wheel having internal outwardly-diverging nozzles opening out into the periphery thereof and communicating with said hollow shaft, a secondary wheel mounted upon the end of a shaft and entirely inclosing the primary wheel the periphery of which is provided with vanes tangentially disposed in an opposite direction to those of said primary wheel, a casing inclosing said secondary wheel and provided with an exhaust-opening, a liquid seal between the shaft of said primary wheel and wall of the secondary wheel, like seals between the casing and shafts of the primary and secondary wheels, a liquid sealing device interposed between said hollow shaft and stationary steam-supply member means to cause water to surround the primary-wheel shaft to cool the same, and a valve-chamber provided with a valve communicating with said stationary steam-supply member, in combination with a governor to operate the valve of said chamber to intermittingly supply steam to the primary wheel.

19. In a steam-turbine, a primary wheel receiving steam through its shaft and discharging the same through openings in its periphery, and a secondary wheel entirely inclosing the primary wheel the periphery of which is provided with vanes between which the steam passes upon issuing from the openings in the primary wheel.

20. In a steam-turbine, a primary wheel receiving steam at its axis and discharging the same from tangentially-disposed openings in its periphery, and a secondary wheel entirely inclosing said primary wheel the periphery of which is provided with vanes tangentially disposed in an opposite direction to the openings of said primary wheel.

21. In a steam-turbine, two power-generating wheels rotating in opposite directions, one receiving steam through a hollow shaft upon which it revolves and is driven by the initial energy of the steam and the other driven by the steam velocity acting upon vanes carried thereby after leaving the first-mentioned wheel, a liquid sealing device interposed between the hollow revoluble shaft of the steam pressure and expansion wheel and the fixed supply-pipe communicating therewith.

22. In a steam-turbine, two power-generating wheels rotating in opposite directions, one receiving steam through a hollow shaft upon which it revolves and is driven by the initial energy of the steam and the other driven by the steam velocity acting upon vanes carried thereby after leaving the first-mentioned wheel, a liquid sealing device interposed between the hollow revoluble shaft-pipe of the steam pressure and expansion wheel and the fixed supply-pipe communicating therewith, and a governor-controlled valve to intermittingly supply steam to said first-mentioned wheel.

23. In a steam-turbine, two power-generating wheels rotating in opposite directions, one receiving steam through a hollow shaft upon which it revolves and is driven by the initial energy of the steam and the other driven by the velocity acting upon vanes carried thereby after leaving the first-mentioned wheel, a liquid sealing device interposed between the hollow revoluble shaft of the steam pressure and expansion wheel and the fixed supply-pipe communicating therewith, and means for forming a vacuum between the said wheels and the casing inclosing the same.

24. In a steam-turbine, two power-generating wheels rotating in opposite directions, one receiving steam through a hollow shaft upon which it revolves and is driven by the initial energy of the steam and the other driven by the steam velocity acting upon vanes carried thereby after leaving the first-mentioned wheel, a liquid sealing device interposed between the hollow revoluble shaft of the steam-expansion wheel and the fixed supply-pipe communicating therewith, and a governor-controlled valve to intermittingly supply steam to said first-mentioned wheel, and means for forming a vacuum between the said wheels and the casing inclosing the same.

25. The combination with the primary wheel, of a hollow shaft, a steam-tube inclosed thereby, and a space between said tube and shaft partly filled with liquid said liquid adapted to cling to the interior wall of the shaft by centrifugal motion and prevent heating thereof.

26. The combination with the primary wheel, of a hollow shaft, a steam-tube inclosed thereby and rotatable therewith, and a space between said tube and shaft partly filled with liquid, said liquid adapted to cling to the interior wall of the shaft by centrifugal motion and prevent heating thereof.

In testimony whereof I have hereunto signed my name in the presence of two subscribing witnesses.

FREDERICK W. REEVES.

In presence of—
  HARRY E. MIX,
  THOMAS D. CARLIN.